United States Patent [19]

Tippmann

[11] Patent Number: 4,864,788
[45] Date of Patent: Sep. 12, 1989

[54] BUILDING CONSTRUCTION ELEMENT AND THE MACHINE AND METHOD FOR ITS MANUFACTURE

[76] Inventor: Eugene R. Tippmann, 4221 Boca Trail, Fort Wayne, Ind. 46815

[21] Appl. No.: 208,119

[22] Filed: Jun. 17, 1988

Related U.S. Application Data

[62] Division of Ser. No. 913,455, Sep. 30, 1986, Pat. No. 4,767,581.

[51] Int. Cl.⁴ ............................ E04C 2/34; E04B 2/32
[52] U.S. Cl. .................................. 52/309.8; 52/309.9; 52/529
[58] Field of Search .............................. 428/86, 309.9; 52/309.8, 309.9, 675, 529

[56] References Cited

U.S. PATENT DOCUMENTS

| | | | |
|---|---|---|---|
| 420,658 | 2/1890 | Hayes | 52/675 |
| 3,591,444 | 7/1971 | Hoppe | 428/86 |
| 4,304,080 | 12/1981 | Freeman | 52/309.9 |

Primary Examiner—James L. Ridgill, Jr.
Attorney, Agent, or Firm—Joseph J. Baker

[57] ABSTRACT

A building construction element such as insulative siding is disclosed having an outer skin with an inner surface on which a plurality of individual, spaced-apart, arcuate-shaped projections are cut or gouged from the inner surface by a cutting tool means. A low density polymetric foam material is disposed over the inner surface so as to completely surround each arcuate projection to thereby securely lock the skin to the foam material after it sets.

2 Claims, 2 Drawing Sheets

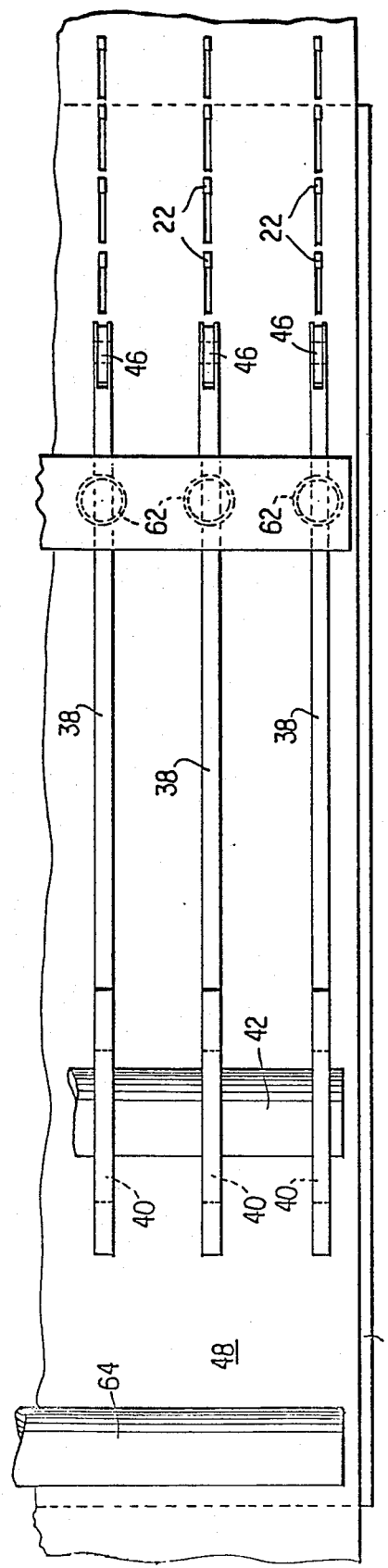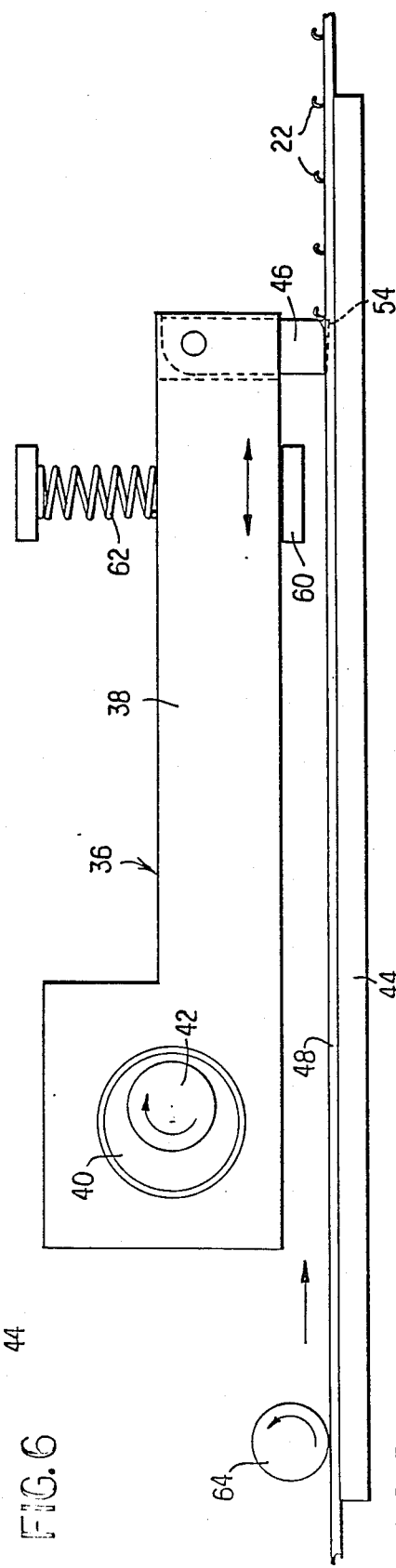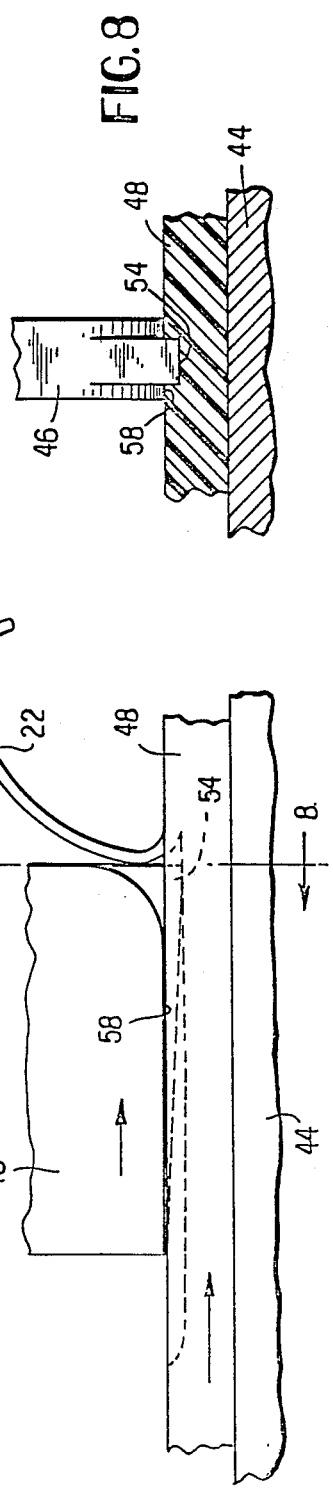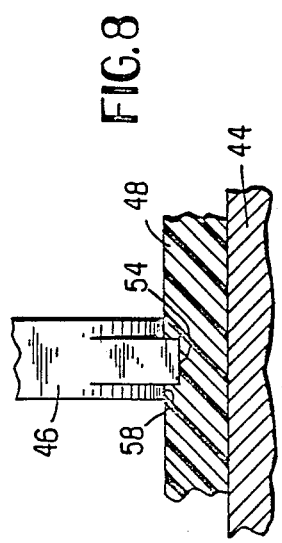
FIG. 6
FIG. 5
FIG. 7
FIG. 8

4,864,788

BUILDING CONSTRUCTION ELEMENT AND THE MACHINE AND METHOD FOR ITS MANUFACTURE

This is a divisional application of Ser. No. 913,455, filed Sept. 30, 1986, now U.S. Pat. No. 4,767,581.

BACKGROUND OF THE INVENTION

This invention relates to building construction elements such as siding or paneling and more specifically to those of the type having a core or backing of foam polymetric material on an vinyl cover.

Various construction elements for buildings and the like comprising a vinyl covering with a low density foam of polymetric material disposed on a surface thereof to form panels, siding, beans and the like are known. The most limiting factor which prevents their more widespread use is the problem of delamination of the foam material from the vinyl covering as a result of impact, ageing or environmental influences such as temperature, moisture and the like. Because the foam plastic material will normally not bond to materials such as vinyl, methods have been devised to mechanically lock the foam material to the vinyl.

U.S. Pat. No. 4,304,080 discloses one such means which comprises plurality a of spaced-apart tabs which extend longitudinally of the vinyl covering and are extruded or otherwise formed with the vinyl covering itself. This formation of the vinyl covering and projections are extruded through what is known as a "profile die". While vinyl covering has the required final shape or cross-section as it exits a profile die, this type of extruding is very slow and thus unsatisfactory when high production is desired. High production is achieved by extruding the vinyl covering material through a "sheet die" and then forming it into the desired shaped by passing it through pinch rolls which is commonly known as "post forming". During this "post forming" operation of the vinyl sheet extrusion, embossing of the outer surface of the covering to impart a simulated wood grain or other effect can be done. As can readily be seen, with the locking rib disclosed in the aforementioned U.S. patent protruding from the back of the extruded vinyl covering, no post forming or embossing is possible because such ribs prevent the passage of the covering through the required pinch rolls.

Applicant's novel method comprises the gouging or cutting of a plurality of arcuate-shaped projections from the back or inside surface of the covering after all post forming operations have been completed thus enabling the higher speed "sheet die" extrusion method to be employed. In addition, because Applicant's projections are arcuate or curved in shape, a considerably better mechanical lock between the vinyl covering and foam material is achieved than by prior art means and one that will resist delamination irrespective of the direction an impact is applied, which is not the case of the ribs that are extruded in that they are parallel to each other and normally extend in the same direction.

It is therefore the primary objection of the present invention to provide a superior building construction element together with the machine and method to manufacture it.

It is another object of the present invention to provide a novel means to mechanically lock the vinyl covering to the plastic foam material together to resist delamination by environmental influences or forces applied there to in any direction.

It is yet another object of the present invention to provide a novel method of forming a locking projection on the inside surface of the vinyl covering which enables the covering to be extruded more rapidly by means of a sheet-type die and post formed and embossed by passage through pinch-type rolls.

It is a still further objection of the present invention to provide a novel, simple, inexpensive apparatus for forming the locking projections on the inside surface of a post formed extrusion.

Other objects and advantages of the present invention will become apparent and obvious from a study of the following description and accompanying drawings, which are merely illustrative of the present invention.

BRIEF DESCRIPTION OF THE DRAWINGS

FIG. 5 is a side elevational view of the machine for cutting arcuate projections;

FIG. 6 is a plan view taken along the lines 6—6 of FIG. 5;

FIG. 7 is an enlarged view of the cutting blade used in the machine of FIG. 5; and FIG. 8 is a view in partial cross-section taken along the lines 8—8 of FIG. 7.

DETAILED DESCRIPTION

Figure 1:
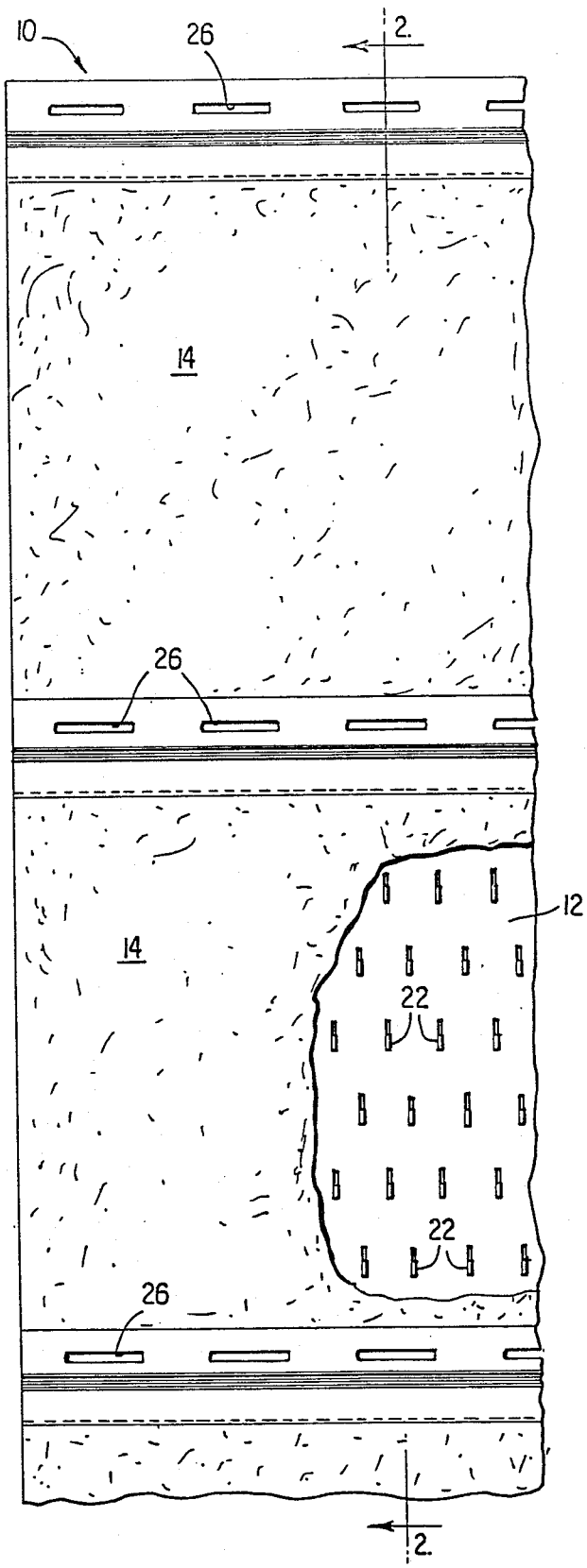
FIG. 1 is a front elevational view with partial cutaway to two interlocked sections of siding constructed according to the present invention.

Referring now to the drawings where like characters of reference indicate like elements in each of the several views, numeral 10 refers generally to a building construction element such as insulated siding which is attachable to the outside of a building in inner connected fashion.

Figure 2:
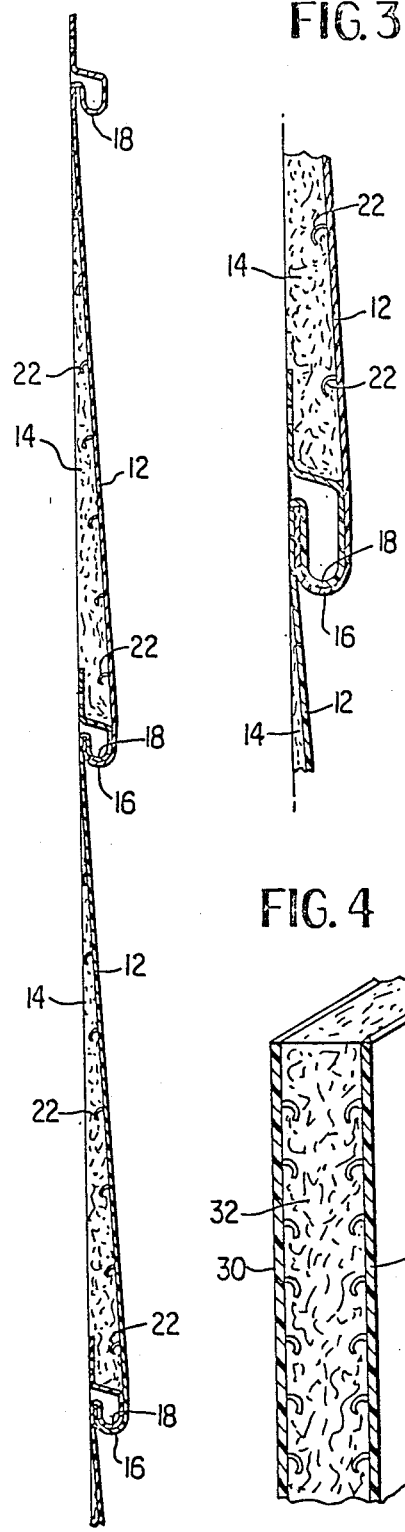
FIG. 2 is a cross-sectional view of the two sections of siding taken along lines 2—2 of FIG. 1.
Figure 3:
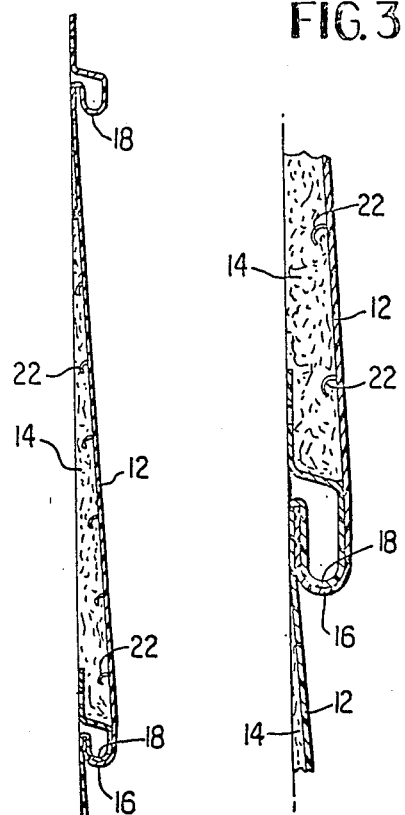
FIG. 3 is an enlarged view of the circled portion of FIG. 2.

The siding element 10 shown in FIGS. 1–3 has an outer skin 12 and a core 14 of polymetric material. The outer skin 12 is an elongated sheet of a material such as vinyl formed in a conventional manner by extruding it as a flat sheet from a sheet-type die and then post forming it by passing the warm, pliable sheet through a series of pinch-type rolls to thereby form the curved or hook end 16 and interlocking projection 18. Simulated wood graining (not shown) can also be formed on the outer surface 20 by passing the plaiable, vinyl sheet between embossing rollers in a conventional manner. The core 14 is of rigid foam urethane material and can be applied to the outer skin 12 by injecting it into a continuously moving mold containing the outer skin 12 in a machine such as that disclosed in my U.S. Pat. No. 4,149,840. The core material 14 expands in the mold against outer skin 12 and takes the shape of the interior of the mold.

Because the foam plastic urethane material 14 will normally not bond to materials such as vinyl particularly if subjected to impact, aging or environmental influences such as temperature, moisture and the like as aforementioned locking tabs 22 are provided to lock the outer skin 12 to the core material 14. The locking tabs 22 are spaced-apart projections cut or gouged from the inner surface 24 of the outer skin 12 and extend above the plane thereof in a manner to be described in detail later. The locking tab 22 is substantially arcurate or curved in shape and is integrally connected at one end to the outer skin 12. The core material 14 flows around the locking tabs 22 and provides a mechanical lock between the core material 14 and the outer skin 12. Because the locking tabs 22 are arcurate in shape and not the straight, finger like projections often seen, the foam material surrounds each tab and cannot be easily forced or pulled off thereof by external forces or conditions. The end of the outer skin 12 containing the interlocking projections 18 can be provided with apparatus 26 for securing the siding 10 to the building by nails etc.

Figure 4:
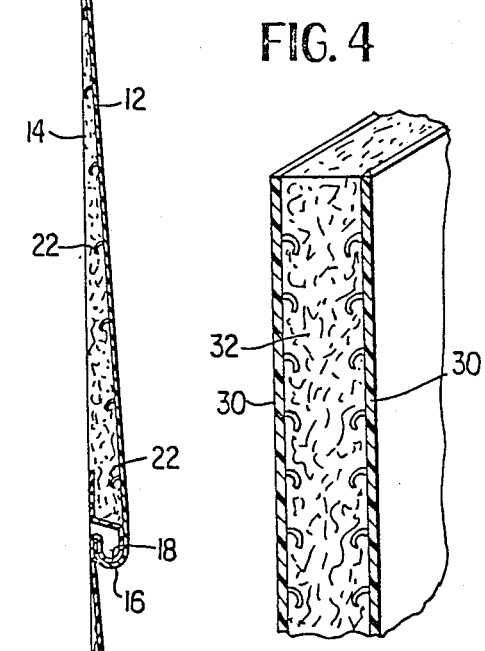
FIG. 4 is a cross-sectiopnal view of a panel or bean constructed according to the present invention.

FIG. 4 is another embodiment of the present invention which is a composit that can be used as an insulated bean or panel member 28. The member 28 has two vinyl outer layers 30 each with locking tabs 22 which secure or mechanically lock the layers 30 to the foam core 32. This composit is extremely rigid and can be used in large sheets or panels such as for garage doors and the like that are subjected to extreme impact forces from slamming etc. because the unique locking tabs 22 prevent delamination of the layers 30 from the foam core 32.

Referring now to FIGS. 5–8, an apparatus 36 is disclosed for forming the locking 22. The apparatus 36 comprises a plurability of arms 38 pivotably mounted at one end on an eccentric 40 connected to a rotatable shaft 42. The arms 38 are positioned above a platform 44 and have a cutting blade 44 mounted in the other end thereof. The vinyl extrusion 48, from which the interlocking tabs 22 are to be cut, is positioned with its outside surface 50 adjacent the platform 44 and its inside surface 52 facing the cutting blade 46.

The cutting blade 46 has a cutting edge 54 located centrally thereof and between channels 56 formed on either side thereof The channels 56 have a lower surface 58 which serves to limit the depth the cutting edge 54 can enter the inside surface 52 of the extrusion 48 as will be more fully decribed later. A support 60 is located beneath each arm 38 to limit the downward travel of the arm 38 and attached cutting blade 46 and a spring 62 biases the arm 38 into engagement with the support 60.

In operation, a flat sheet or extrusion 48 is moved from left to right as viewed in FIG. 5 on the platform 44 at a constant speed by drive means 64. Rotation of the shaft 42 and eccentric 40 causes each are 38 to reciprocate horizontally above the moving extrusion 48. As the arms 38 move from left to right as viewed in FIG. 5, the cutting edge 54 is caused to move into the path of the extrusion 48 whereupon it cuts or gouges an arcuate locking tab 22 from the inside surface 52 leaving it attached at one end to the extrusion 48. The thickness of the locking tab 22 where it is attached to the extrusion 48 is determined by the location of previously mentioned lower surface 58 in each channel 56. These lower surfaces 58 on each side of the cutting edge 54 engage the inside surface 52 and limit the travel of the edge 54 into the extrusion 48. Continued rotation of the eccentric 40 causes the return of the arm 38 right to left as viewed in FIG. 5 and withdrawal of the cutting edge 54 against the bias of spring 62 and the process is repeated. Typically, the spacing between locking tabs is one inch, the height the locking tab extends approximately one-fourth inch above the plane of the inside surface 52 and the depth of the cut is approximately five-thousandths of an inch.

What is claim is:

1. A building element comprising:
   (a) an elongated strip of polymeric material forming an outer skin for said element, said strip having an outer facing surface and an inner surface containing a plurality of individual spaced-apart projections gouged from a portion of the thickness of the material forming said inner surface and extending above the plane of said inner surface, each of said projections being arcuate in shape and integrally connected at one end with said strip, and
   (b) a low density plastic material disposed over said inner surface and around said arcuate projections to mechanically lock said strip to said foam material and thereby resist separation of said strip from said foam material irrespective of the direction of movement of said strip relative to said foam material after said foam sets.

2. A building element as set forth in claim 1 wherein said low density plastic material is polyurethane foam.

* * * * *